US009341052B2

(12) United States Patent
Gadberry et al.

(10) Patent No.: US 9,341,052 B2
(45) Date of Patent: May 17, 2016

(54) THICKENED VISCOELASTIC FLUIDS AND USES THEREOF

(75) Inventors: James F. Gadberry, Danbury, CT (US); Michael J. Engel, Mount Kisco, NY (US); John Douglas Nowak, Yonkers, NY (US); Jian Zhou, Danbury, CT (US); Xiaoyu Wang, Shanghai (CN)

(73) Assignee: AKZO NOBEL CHEMICALS INTERNATIONAL B.V., Amersfoort (NL)

(*) Notice: Subject to any disclaimer, the term of this patent is extended or adjusted under 35 U.S.C. 154(b) by 240 days.

(21) Appl. No.: 14/118,719

(22) PCT Filed: May 21, 2012

(86) PCT No.: PCT/EP2012/059320
§ 371 (c)(1),
(2), (4) Date: Nov. 19, 2013

(87) PCT Pub. No.: WO2012/160008
PCT Pub. Date: Nov. 29, 2012

(65) Prior Publication Data
US 2014/0076572 A1    Mar. 20, 2014

Related U.S. Application Data

(60) Provisional application No. 61/489,058, filed on May 23, 2011.

(30) Foreign Application Priority Data

Sep. 5, 2011    (EP) .................................... 11180016

(51) Int. Cl.
| | | |
|---|---|---|
| C09K 8/584 | (2006.01) |
| C09K 8/28 | (2006.01) |
| C09K 8/22 | (2006.01) |
| C09K 8/60 | (2006.01) |
| C23F 11/16 | (2006.01) |
| E21B 43/00 | (2006.01) |
| C09K 8/528 | (2006.01) |
| E21B 43/26 | (2006.01) |
| C09K 8/68 | (2006.01) |
| C09K 8/74 | (2006.01) |

(52) U.S. Cl.
CPC ................. *E21B 43/26* (2013.01); *C09K 8/602* (2013.01); *C09K 8/68* (2013.01); *C09K 8/74* (2013.01); *C09K 2208/30* (2013.01)

(58) Field of Classification Search
CPC .................................................. C09K 2208/30
USPC ......... 507/240, 247, 252, 255, 256, 258, 259, 507/135, 139, 266; 166/308.4
See application file for complete search history.

(56) References Cited

U.S. PATENT DOCUMENTS

| | | | | |
|---|---|---|---|---|
| 5,531,933 A | * | 7/1996 | Masters ................... | C11D 1/12 510/181 |
| 2002/0023752 A1 | * | 2/2002 | Qu .......................... | C09K 8/68 166/308.1 |
| 2002/0028753 A1 | * | 3/2002 | Fischer ................ | C11D 3/3932 510/302 |
| 2002/0064510 A1 | | 5/2002 | Dalrymple et al. | |
| 2008/0161207 A1 | | 7/2008 | Welton et al. | |
| 2008/0161210 A1 | | 7/2008 | Welton et al. | |
| 2009/0111716 A1 | | 4/2009 | Hough et al. | |
| 2009/0264334 A1 | * | 10/2009 | Ferreyra ................... | C11D 1/37 510/420 |

FOREIGN PATENT DOCUMENTS

| | | |
|---|---|---|
| CN | 1930265 A | 3/2007 |
| CN | 101679846 A | 3/2010 |
| CN | 101812290 A | 8/2010 |
| WO | WO2009/064719 A1 | 5/2009 |

OTHER PUBLICATIONS

Search Report of corresponding European Patent Application No. 11180016.5, dated Nov. 24, 2011.
Search Report of corresponding International Patent Application No. PCT/EP2012/059320, mailed Jun. 25, 2012.

* cited by examiner

Primary Examiner — Aiqun Li
(74) Attorney, Agent, or Firm — Matthew D. Kellam

(57) ABSTRACT

The present invention generally relates to a viscoelastic fluids, thickened acid compositions and the like and to methods of using said gelled compositions. The thickened compositions of the present invention can usefully be employed in methods of stimulating and/or modifying the permeability of underground formations, in drilling fluids, completion fluids, workover fluids, acidizing fluids, fracturing, gravel packing and the like.

16 Claims, No Drawings

THICKENED VISCOELASTIC FLUIDS AND USES THEREOF

This application is a National Stage entry of International Application PCT/EP2012/059320, filed May 21, 2012, which claims the benefit of U.S. Patent Application No. 61/489,058, filed May 23, 2011, and European Patent Application No. 11180016.5, filed Sep. 5, 2011. The contents of the aforementioned applications are incorporated herein by reference in their entireties.

FIELD OF THE INVENTION

The present invention generally relates to thickened viscoelastic compositions and uses thereof. The gels of the invention are thickened with a gelling agent that comprises erucamidopropyl hydroxypropyl sulfobetaine.

BACKGROUND OF THE INVENTION

The present invention generally relates to viscoelastic compositions, thickened acid gels and uses for such thickened gels. For example, acid thickened solutions can be usefully employed in cleaning formulations such as hard surface cleaners, toilet bowl cleaners, industrial cleaners, and the like and in oilfield applications such as well stimulation. These and other uses will be apparent to the skilled artisan.

The compositions of the present invention are particularly useful in oilfield applications. Hydrocarbons are obtained by drilling a well that penetrates a subterranean hydrocarbon-bearing formation providing a partial flowpath for the oil to reach the surface. In order for oil travel from the formation to the wellbore there must be a flowpath from the formation to the wellbore. This flowpath is through the formation rock and has pores of sufficient size and number to allow a conduit for the oil to move through the formation.

A common reason for a decline in oil production is damage to the formation that plugs the rock pores and impedes the flow of oil to the wellbore and ultimately to the surface. This damage generally arises from deliberately injecting another fluid into the wellbore. Even after drilling, some drilling fluid remains in the region of the formation near the wellbore, which may dehydrate and form a coating on the wellbore. The natural effect of this coating is to decrease the permeability to oil moving from the formation in the direction of the wellbore.

Another reason for a decline in oil production occurs when the pores of the formation are small in size such that oil migrates toward the wellbore only very slowly. In both circumstances, it is desirable to improve the low permeability of the formation.

Well stimulation refers to the various techniques employed to improve the permeability of a hydrocarbon-bearing formation. Three general well-stimulation techniques are typically employed. The first involves injecting chemicals into the wellbore to react with and dissolve permeability damaging materials such as wellbore coatings. A second method requires injecting chemicals through the wellbore and into the formation to react with and dissolve small portions of the formation thereby creating alternative flowpaths for the hydrocarbons to flow to the wellbore. These alternative flow paths redirect the flow of oil around the low permeability or damaged areas of the formation. A third technique, often referred to as fracturing, involves injecting chemicals into the formation at pressures sufficient to actually fracture the formation, thereby creating a large flow channel though which hydrocarbon can more readily move from the formation and into the wellbore.

The thickened viscoelastic fluids of the present application also have applications in hydraulic fracturing, in gravel packing and in other well stimulation techniques known to one of ordinary skill in the art. Additionally, the acid thickened fluids of the present invention can usefully be employed in various household and industrial cleaners including, but not limited to, detergent compositions, toilet bowl cleaners, hard surface cleaners, grease cutting compositions, and the like.

SUMMARY OF THE INVENTION

The present invention generally relates to a viscoelastic fluids, thickened acid compositions and the like and to methods of using said gelled compositions. The thickened compositions of the present invention can usefully be employed in methods of stimulating and/or modifying the permeability of underground formations, in drilling fluids, completion fluids, workover fluids, acidizing fluids, fracturing, gravel packing and the like. Additionally, the acid thickened compositions of the present invention can also be employed in cleaning formulations, water-based coatings, detergent formulations, personal care formulations, water based asphalt formulations and the like.

DETAILED DESCRIPTION OF THE INVENTION

The present invention generally relates to viscoelastic compositions or fluids, and to methods of using said fluids/compositions. The thickened compositions of the present invention can usefully be employed in methods of stimulating and/or modifying the permeability of underground formations, in drilling fluids, completion fluids, workover fluids, acidizing fluids, gravel packing, fracturing and the like. Additionally, the thickened compositions of the present invention can also be employed in cleaning formulations, water-based coatings, detergent formulations, personal care formulations, water based asphalt formulations and the like.

Viscoelasticity is a desirable rheological feature in drilling fluids, workover or completion fluids, and stimulation fluids which can be provided by fluid modifying agents such as polymeric agents and surfactant gelling agents. Viscoelastic fluids are those which exhibit both elastic behavior and viscous behavior. Elasticity is defined as an instant strain (deformation) response of a material to an applied stress. Once the stress is removed, the material returns to its undeformed equilibrium state. This type of behavior is associated with solids. On the other hand, the viscous behavior is defined as a continuous deformation resulting from an applied stress. After a while, the deformation rate (shear rate or strain rate in general) becomes steady. Once the stress is removed, the material does not return to its initial undeformed state. This type of behavior is associated with liquids. Viscoelastic fluids may behave as a viscous fluid or an elastic solid, or a combination of both depending upon the applied stress on the system and the time scale of the observation. Viscoelastic fluids exhibit an elastic response immediately after the stress is applied. After the initial elastic response, the strain relaxes and the fluid starts to flow in a viscous manner. The elastic behaviour of fluids is believed to aid significantly in the transport of solid particles.

The viscosity of a viscoelastic fluid may also vary with the stress or rate of strain applied. In the case of shear deformations, it is very common that the viscosity of the fluid drops with increasing shear rate or shear stress. This behavior is usually referred to as "shear thinning". Viscoelasticity in fluids that is caused by surfactants can manifest itself shear thinning behavior. For example, when such a fluid is passed through a pump or is in the vicinity of a rotating drill bit, the fluid is in a high shear rate environment and the viscosity is low, resulting in low friction pressures and pumping energy savings. When the shearing stress is abated, the fluid returns to a higher viscosity condition. This is because the viscoelastic behavior is caused by surfactant aggregations in the fluid. These aggregations will adjust to the conditions of the fluid, and will form different aggregate shapes under different shear stresses. Thus, one can have a fluid that behaves as a high viscosity fluid under low shear rates, and a low viscosity fluid under higher shear rates. High low shear-rate viscosities are good for solids transport.

The elastic component of a viscoelastic fluid may also manifest itself in a yield stress value. This allows a viscoelastic fluid to suspend an insoluble material, for example sand or drill cuttings, for a greater time period than a viscous fluid of the same apparent viscosity. Yield stresses that are too high are not a good thing in drilling, as it may make restarting the drilling bit very difficult and causes a condition called "stuck pipe".

Another function of viscoelastic fluids in oil drilling applications is in permeability modification. Secondary recovery of oil from reservoirs involves supplementing by artificial means the natural energy inherent in the reservoir to recover the oil. For example when the oil is stored in a porous rock it is often recovered by driving a pressurized fluid, such as brine, through one or more drill holes (injecting wells) into the reservoir formation to force the oil to a well bore from which it can be recovered. However, rock often has areas of high and low permeability. The brine injected can finger its way through the high permeability areas leaving unrecovered oil in the low permeability areas.

The aqueous viscoelastic fluid of the invention comprises at least one gelling agent and/or viscoelastic surfactant of the general formula:

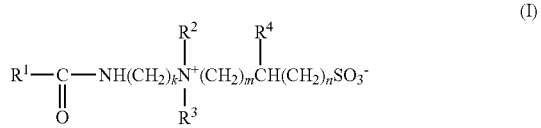

(I)

wherein $R_1$ is a saturated or unsaturated, hydrocarbon group of from about 17 to about 29 carbon atoms, in another embodiment from about 18 to about 21 carbon atoms. In one embodiment, $R_1$ is a fatty aliphatic derived from natural fats or oils having an iodine value of from about 1 to about 140, in another embodiment from about 30 to about 90, and in another embodiment from 40 to about 70. $R_1$ may be restricted to a single chain length or may be of mixed chain length such as those groups derived from natural fats and oils or petroleum stocks. Examples are tallow alkyl, hardened tallow alkyl, rapeseed alkyl, hardened rapeseed alkyl, tall oil alkyl, hardened tall oil alkyl, coco alkyl, oleyl, erucyl or soya alkyl. $R_2$ and $R_3$ are each independently selected from a straight chain or branched, alkyl or hydroxyalkyl group of from 1 to about 6 carbon atoms, in another embodiment, of 1 to 4 carbon atoms and still another embodiment from 1 to 3 carbon atoms. $R_4$ is selected from H, OH, alkyl or hydroxyalkyl groups of from 1 to about 4 carbon atoms; in another embodiment ethyl, hydroxyethyl, OH or methyl. Of the remaining substituents, k is an integer of from 2-20, in another embodiment 2-12, and in still another embodiment 2-6, and in yet and in still another embodiment 2-4; m is an integer of from 1-20, in another embodiment 1-12, and in still another embodiment 1-6, and in still another embodiment 1-3; and n is an integer of from 0-20, in another embodiment 0-12, and in still another embodiment 0-6, and in still another embodiment 0-1.

The gelling agents disclosed and described herein are surfactants that can be added singly or they can be used as a primary component in the aqueous, thickened compositions of the present invention. Examples of gelling agents contemplated by the present invention include but are not limited to those selected from the group consisting of erucamidopropyl hydroxypropyl sulfobetaine, erucamidopropyl hydroxyethyl sulfobetaine, erucamidopropyl hydroxymethyl sulfobetaine mixtures thereof, and the like. Erucamidopropyl hydroxypropyl sulfobetaine, also known as erucamido hydroxysultaine, is an example of a gelling agent usefully employed in the viscoelastic fluid of the invention.

In an exemplary process for preparing the gelling agents in accordance with the invention, erucamidopropyl hydroxypropyl sulfobetaine, N-(3-dimethylaminopropyl)erucamide is reacted with sodium 3-chloro-2-hydroxy-1-propanesulfonate (HOPAX "CHOPSNA") in the presence of SCA 40B ethanol (co-solvent 1), deionized water (co-solvent 2), propylene glycol (co-solvent 3) and NaOH under $N_2$. The reaction mixture is heated to 112° C.-115° C. with stirring until free amine and amine salt contents are both below 1%. NaOH adjustment is made if the amine salt content is above 1%. After the free amine and amine salt are confirmed to be in-specification, the reaction mixture is cooled to 65° C. and depressurized. Water is then added to the batch to dissolve all of the salts. The final water concentration range is generally from about 15-25%, in another embodiment 15-17.5%.

For optimum performance, several solvents are utilized in the preparation and use of the composition of the invention. A first solvent is a di-hydric, or polyhydric alcohol, which can be oligomeric, or polymeric. Examples include, but are not limited to ethylene glycol, butylene glycol, diethylene glycol, polypropylene glycol, polyethylene glycol, glycerin, propylene glycol, tetramethylene glycol, tetramethylethylene glycol, trimethylene glycol, and the like. Propylene glycol (e.g., 1,2 propanediol) are preferred glycols.

A second co-solvent, an alcohol, e.g., is also utilized. The alcohols useful herein as a cosolvent are generally monohydric alcohols and may be alkanols or alcohol alkoxylates. Methanol, ethanol, and butanol are non limiting examples. In one embodiment ethanol is an example of an alcohol usefully employed in the context of the invention.

Water is the third solvent.

The relative quantities and order of addition of the co-solvents are important to prevent the reaction mass from gelling, to dissolve the salts for a filtration free process, to prevent formation of a small upper ethanol phase in the product, and to minimize the product's melting point. In this regard, a glycol, e.g., propylene glycol is generally added upfront to avoid potential gelling of the batch. The amount of propylene glycol added is generally in the range of from about 10 wt % to about 16 wt %; in another embodiment from about 12 wt % to about 15 wt %; and in another embodiment, 13 wt %, or 14 wt %.

The second co-solvent, e.g., ethanol, is added in an amount of from about 16 wt % to about 22 wt %, in another embodiment from about 17 wt % to about 21 wt %, and in another embodiment, 18 wt %, 19 wt % or 20 wt %.

The total weight % ethanol+propylene glycol is from about 25 weight % to about 40 weight %; in another embodiment from about 30-35 weight % and in still another embodiment 31 wt %, 32 wt %, 33 wt % or 34 wt %. The weight to weight ratio range of ethanol to propylene glycol can vary from about 1.0 to 2.2 to avoid batch gelling and formation of an upper ethanol liquid phase. The total amount of ethanol and propylene glycol are kept constant relative to the amount of the N-(3-dimethylaminopropyl)erucamide which is used. The melting point of the final product is ~20° C. if the propylene glycol is removed from the solution, but is reduced to ~12° C. by adding propylene glycol.

The final concentration range of the third solvent, water, is generally from about 15-25%, in another embodiment 15-17.5%. In one embodiment, a minimum water content of the final batch solution of about 15% is utilized to be sure that all of the salts are dissolved (byproduct sodium chloride and excess CHOPSNa). Additionally, too little ethanol in the batch vs. the water can cause the batch to gel. The nominal weight to weight ratio range of ethanol to water is typically from about 1.0 to 1.175 to avoid a potential gelling situation.

The viscoelastic fluid of the invention does not undergo phase separation over extended periods of time and exhibits high heat stability.

In one embodiment the invention relates to an aqueous viscoelastic fluid useful as a fracturing fluid, and to a method of fracturing a subterranean formation. Such fluids create channels or fractures in oil producing reservoir zones in order to improve oil production by providing a high permeability pathway from the reservoir rock to the well bore. Typically, in low permeability zones, fracturing fluids are pumped at pressures exceeding the overburden weight of the rock formation thereby causing splits and fractures in the formation rock. Propping agents (e.g. particulate matter) are added to the fluid to prevent the induced fractures from closing after the pumping phase is over by propping open the induced splits and fractures. Gelling agents are added to the fluid to transport such propping agents and to reduce fluid leakoff. In higher permeability zones, different methods may be used, but fluid thickeners are often utilized.

The viscoelastic compositions disclosed herein provide several advantages over the polymers (e.g., polysaccharides) currently used as gelling agents for downhole fluids. For example, the gelling agents set forth herein when used for downhole fluid produce less residue on the formation which could result in formation damage during and after the downhole process. Also, it is easier to prepare the gelled fluid as compared with polymers which typically must be hydrated, and the gelled fluid can be designed to "break" with formation temperatures or other factors such as oxidizers or acids. One can also "break" the gelled fluid by using solvents such as hydrocarbons, alcohols, or even produced oil from the formation. The gelling agents set forth below are useable over a wide range of temperature depending on chain length, and can assist in removing oil from the formation.

For purposes of selectively modifying the permeability of underground rock formations the viscoelastic composition of the invention can first be blended with water and different types and amounts of inorganic and organic salts to form a viscoelastic fracturing fluid which is then injected into the rock formation in an amount effective to reduce the permeability of the more permeable zone(s) of the formation. The concentration of viscoelastic composition in the fluid can be from about 0.5% to about 10%, preferably from about 2% to about 8%, and more preferably from about 3% to about 5% by weight.

In another embodiment, the invention contemplates an aqueous, acid thickened composition comprising one or more gelling agents and acid in an aqueous solution as described below. The thickened acid gels disclosed and described herein can advantageously be employed as an acidizing fluid. A major portion of the world's hydrocarbon reserves are found in carbonate rock structures which are known to have very low permeability. In many sandstone reservoirs, the rock structure may be cemented together by carbonate, or carbonate scales may accumulate close to production wells as a result of carbon dioxide being released from solution due to a pressure drop. Another type of scale that can accumulate around production wells is iron scale, in particular iron oxides and hydroxides. Low permeability, drilling damage and accumulation of scale all impede the flow of oil to the production well and the conventional method used to open up channels around the well bore to improve the flow rate is the injection of acid known as acidizing or acid stimulation.

There are two types of acid treatment: fracture acidizing, i.e., injection of acid at rates above fracture pressure to etch the faces of the resultant fractures and matrix acidizing where the injection of acid is at rates below fracture pressure to dissolve flow channels in the rock or to remove scale or damage caused by drilling. Acid treatments are employed in all types of oil wells and occasionally in water wells: they may be used to open fractures or remove damage in newly drilled wells or to rehabilitate old wells from which production has declined. Acid is pumped into the well, where it reacts with the calcium carbonate according to the following reaction:

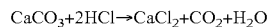

Calcium chloride ($CaCl_2$) is highly soluble in water and the acid etches channels in the rock, thus improving the oil or gas flow towards the production well. Hydrochloric acid reacts immediately with carbonate rock and tends to form a few large channels known as "wormholes" through the rock, rather than opening up the pore structure. The acid penetration distance is limited to a few feet at most.

Because hydrochloric acid reacts so rapidly when contacted with carbonate rock, a number of products have been developed which aim to reduce the reaction rate, allowing acid to penetrate further into the formation or to react more uniformly around the wellbore. The reaction of hydrochloric acid may be retarded by gelling the acid in accordance with the present invention. Additionally, The acid thickened gel of the present invention have been shown to thicken with calcium carbonate up to about 13-17% at which point the gels phase separate causing rapid thinning.

The reaction of acetic acid is naturally retarded because a build-up of the reaction product, carbon dioxide, reduces the reaction rate. As carbon dioxide bleeds off into the formation or is absorbed by the oil, water or hydrocarbon gas, the reaction of acetic acid continues.

Conventionally hydrocarbon wells in carbonate reservoirs are acidized immediately after drilling before production commences and often repeat treatments are conducted every two to three years.

The thickened acid gels of the present invention are also useful in matrix fracturing where fractures are created by injecting sand suspended in an aqueous fluid (known as proppant) into a well at a rate above fracture pressure. When the injection pressure is removed, the sand remains in place, propping the fracture open. It is very unusual for a propped fracture subsequently to be treated with hydrochloric acid, since the rapid reaction rate between the acid and the rock may cause collapse of the fracture. However damage may be caused by the filtering out of gels from the proppant suspension on the fracture faces and this can substantially reduce the rate of oil or gas flow into the fracture.

Conventionally oil wells are drilled vertically down into the oil reservoir and through the payzone of the reservoir. Oil flows into the vertical wellbore. In recent years the drilling of wells out from the vertical wellbore in a horizontal direction through the reservoir has become widespread. In many cases horizontal wells have increased hydrocarbon production by several orders of magnitude. The removal of drilling damage caused by accumulation of drilling mud filter cake and fine rock particles from horizontal wells is a very costly process due to the need to use specialist techniques, such as injection of acid through coiled tubing, to avoid corrosion of wellhead equipment and prevent hydrochloric acid being spent before it reaches the far end of the horizontal well. The purpose of an acid treatment or acidizing the formation is to remove formation damage along as much of the hydrocarbon flow path as possible. An effective treatment must therefore remove as much damage as possible along the entire flow path. The fluids and techniques of the present invention allow maximum penetration of the acid resulting in a more effective treatment.

Finally, when a reservoir has been exhausted due to reduction of natural reservoir pressure, water or carbon dioxide gas may be injected to recover a further percentage of the oil-in-place. Water or gas is injected through a proportion of wells in the reservoir (injector wells), thus pushing the oil towards producer wells. In some reservoirs the rate of water injection is low and hence the oil production rate is low. Acid treatments utilizing the acid gels of the present invention can be employed to increase the injectivity of injector wells.

The gelling agents disclosed herein provide several advantages over the polymers (e.g., polysaccharides) currently used as gelling agents for downhole fluids. For example, the compounds set forth herein when used as gelling agents for downhole fluid produce less residue on the formation which could result in formation damage during and after the downhole process.

Also, it is easier to produce the gelled fluid as compared with polymers which typically must be hydrated, and the gelled fluid can be designed to "break" with formation temperatures or other factors such as oxidizers. One can also "break" the gelled fluid by using solvents such as hydrocarbons, alcohols, or even oil from the formation. The gelling agents set forth below are useable over a wide range of temperature depending on chain length, and can assist in removing oil from the formation.

For purposes of selectively modifying the permeability of underground rock formations one or more gelling agent can first be blended with an aqueous acid composition of desired strength to form a thickened acidic viscoelastic fluid which is then injected into the rock formation in an amount effective to modify the permeability of the of the formation. Optionally, the concentration of gelling agent in the acid fluid can be from about 0.5% to about 10%, preferably from about 2% to about 8%, and more preferably from about 4% to about 6% by weight. It is also important that the gelling agent contain less than about 1% free fatty acid for optimum performance.

A sequesterant may also be employed to stabilize the product at higher temperatures during storage. A preferred sequesterant is a phosphonate salt, such as the phosphonate salts sold by Solutia™ under the trade name of Dequest®. A preferred product is Dequest® 2010. The sequestrant can be added either during the process for making the gelling agent composition of the present invention or at any point thereafter.

The concentration of gelling agent composition preferably ranges from about 1% to about 10% depending on the desired viscosity, more preferably about 3% to 8%, and most preferably about 4% to about 6%.

The gelling agents of the present invention have been shown to effectively thicken HCl acid solutions of 0 up to 15%.

The compositions of the present invention can also contain inorganic salts (e.g., brines which contain alkali metal salts, alkaline earth metal salts, and/or ammonium salts), and other viscosity modifying additives (e.g., such as cellulosics). Brines gelled with such agents are advantageously used as water diversion agents, pusher fluids, fracture fluids, drilling muds, gravel-packing fluids, drill-in fluids, workover fluids, completion fluids, and the like.

The gelled acid compositions of the present invention can also be utilized in cleaning and sanitizing formulations, water-based coatings (e.g. paints), detergent formulations, personal care formulations, water-based asphalt systems, concrete, building products, (e.g., motars, plasters, joint compounds, and the like), agricultural drift control agents, in oil well stimulation applications and the like.

When used in stimulation applications, the thickened fluids of the present invention can optionally include lubricants, corrosion inhibitors and various other additives.

Lubricants can include metal or amine salts of an organo sulfur, phosphorus, boron or carboxylic acid. Typical of such salts are carboxylic acids of 1 to 22 carbon atoms including both aromatic and aliphatic acids; sulfur acids such as alkyl and aromatic sulfonic acids and the like; phosphorus acids such as phosphoric acid, phosphorous acid, phosphinic acid, acid phosphate esters, and analogous sulfur homologs such as the thiophosphoric and dithiophosphoric acid and related acid esters; mercaptobenzothiozole; boron acids including boric acid, acid borates and the like; and lauric acid amine salts.

Corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized aromatic carboxylic acids (e.g., 4-(t-butyl)-benzoic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Stimulation fluids can also include additives for specific applications to optimize the performance of the fluid. Examples include colorants; dyes; deodorants such as citronella; bactericides and other antimicrobials; chelating agents such as an ethylene diamine tetraacetate sodium salt or nitrilo triacetic acid; anti-freeze agents such as ethylene glycol and analogous polyoxyalkylene polyols; anti-foamants such as silicone-containing agents and shear stabilizing agents such as commercially available polyoxyalkylene polyols. Anti-wear agents, friction modifiers, anti-slip and lubricity agents may also be added. Also included are extreme pressure additives such as phosphate esters and zinc dialkyl dithiophosphate.

The thickened acid gels of the present invention can also be usefully employed in cleaning and sanitizing formulations, water-based coatings (e.g. paints), detergent formulations, personal care formulations, water-based asphalt systems, concrete, building products, (e.g., motars, plasters, joint compounds, and the like), agricultural drift control agents, in other oil well stimulation and oilfield applications, and the like.

The invention will now be illustrated by the following examples.

Example 1

Synthesis of Erucamidopropyl Hydroxypropylsultaine (Armovis EHS)

A filtration free reaction sequence to make Armovis EHS is summarized below:
To a 2-L Pressure Rated Reaction Vessel are Added:
1. 500 g of N-(3-dimethylaminopropyl)erucamide
2. 260 g of sodium 3-chloro-2-hydroxy-1-propanesulfonate (HOPAX "CHOPSNA").
3. 285.0 g of SCA 40B ethanol (co-solvent 1).
4. 160.0 g of deionized water (co-solvent 2).
5. 195 g of propylene glycol (co-solvent 3).
6. 6.0 g of 50% NaOH under $N_2$.

The mixture is heated to 112° C.-115° C. and stirred well for approximately 6 hours before sampling to confirm that the free amine and amine salt contents are both below 1%. A NaOH adjustment is needed if the amine salt content is above 1%. After the free amine and amine salt are confirmed to be in-specification, the reaction mixture is cooled to 65° C. and depressurized. Water is then added to the batch to dissolve all of the salts. The final water concentration range is 15-17.5%. The final solution is discharged at ~65° C. to a collection vessel. The material is a light yellow liquid.

Notes Regarding the Co-Solvents (Ethanol, Propylene Glycol, and Water):

The relative quantities and order of addition of the co-solvents are important to prevent the reaction mass from gelling, to dissolve the salts for a filtration free process, to prevent formation of a small upper ethanol phase in the product, and to minimize the product's melting point.
  1. Propylene glycol is added upfront to avoid potential gelling of the batch.
  2. The weight to weight ratio range of ethanol to propylene glycol can vary from about 1.0 to 2.2 to avoid batch gelling and formation of an upper ethanol liquid phase. The total amount of ethanol and propylene glycol are kept constant relative to the amount of the N-(3-dimethylaminopropyl)erucamide which is used.
  3. An upper liquid phase of ethanol may form if the propylene glycol is removed or the weight to weight ratio of ethanol to propylene glycol is increased above 2.2.
  4. A weight to weight ratio of ethanol to propylene glycol below 1.0 can result in batch gelling.
  5. The product's melting point is ~20° C. if the PG is removed from the solution. The melting point is reduced to ~12° C. by adding the PG.
  6. The minimum water content of the final batch solution is ~15% to be sure that all of the salts are dissolved (byproduct sodium chloride and excess CHOPSNa).
  7. Too little ethanol in the batch vs. the water can cause the batch to gel. The nominal weight to weight ratio range of ethanol to water is ~1.0 to 1.175 to avoid a potential gelling situation.

A Typical Batch has the Following Composition

| | Product Armovis EHS - 25 L Batch batch 1 | | | | | | |
| --- | --- | --- | --- | --- | --- | --- | --- |
| Sample ID: 2457 Process Note: | 72-1 | 72-2 | 72-3 | 72-4 | 72-6 | 73-3 final | Method |
| Free Amine (MW 424), wt % | 0.8 | 0.8 | | | | 0.8 | VE5.011 |
| Amine Hydrochloride (MW 460), wt % | 0.6 | 0.6 | | | | 0.5 | VE5.011 |
| CHOPSNa (MW 197), wt % | | | | | | 0.9 | calc |
| Sodium Chloride, wt % | | | | | | 4.7 | calc |
| Water, wt % | | 11.2 | 14.1 | 15.2 | 16.0 | 16.5 | VE5.022 |
| pH (as is) | | | | | | 7.8 | EP5.003 |
| Color, Gardner | | | | | | 3.8 | SC5.003 |
| Solids (135° C.), wt % | | | | | | 49.0 | PM5.020 |
| Activity, % | | | | | | 42.1 | Calculation |
| Free Amine, meq/g | 0.019 | 0.020 | | | | 0.019 | VE5.011 |
| Amine Hydrochloride, meq/g | 0.013 | 0.013 | | | | 0.011 | VE5.011 |
| Sodium, meq/g | | | | | | 0.849 | VE5.025 |
| Chloride, meq/g | | | | | | 0.802 | VE5.029 |
| Appearance | solids | solids | | | clear | haze | Visual |

Notes:
1. Sodium chloride was calculated from inorganic chloride content.
2. CHOPSNa was calculated as the difference between sodium and inorganic chloride assays.
3. Activity was calculated as % Solids – % Free Amine – % Amine Salt – % Sodium Chloride – % CHOPSNa

Example 2

General Procedures to Make a Armovis EHS Gel (VES) and Rheology Testing

A brine solution containing 4-8% of salt by weight was stirred in a 500 ml stainless steel blender. To this solution, certain amount (by volume) of Armovis EHS concentrate (40% to 50% by weight in a mixed solvent system containing Ethanol, Propylene glycol and water) was added to the brine solution. The resulting mixture was stirred for 3 min at an rpm of 2000-3000 in a blender. The resultant gel was then centrifuged at an rpm of 1000 for 15 min to remove the air bubbles. Rheological performance was evaluated using a Grace Instrument Rheometer (model M5600) at constant shear rate at different temperatures. A pressure of 400 psi was applied to minimize evaporation of the sample, especially at high temperatures.

Fracturing of a subterranean formation needs a thickened fluid through a wellbore and formation to initiate and extend a fracture into the formation. High viscous fluid is used to prevent the fluid leak off and carry the proppant into the fracture. The polymers have been used to prepare a thickened fluid in the past, however, several disadvantages were observed for polymer-based fracturing fluids: 1) They are shear sensitive. Synthetic polymer-based fracturing fluids are shear thinning non Newtonian fluids. The viscosity is low at high shear rate and does not build up again once the shear rate decreases. 2) They are not salt tolerant. The polymers often precipitate from the solutions with high salinity and can cause severe formation damage. 3) Biopolymers are not very thermally stable. Besides, biocide or oxygen scavenger is needed to keep from biodegradation. 4) A breaker has to be used to break down the viscosity of the gel. However, the break down efficiency is usually very low even though a breaker is used. To overcome all of these shortcomings, surfactant-based fracturing fluids have been generated to give a much cleaner system for the subterranean formation. The fluids are often made in 4-8% KCl or $NH_4Cl$ solutions to stabilize the clay/shale formation.

Examples 3-6 illustrate the effect of Armovis EHS concentration on rheology performance of different fluids for fracturing fluids.

Example 3

Effect of Gellant Concentration on Viscosity

| Concentration of Armovis EHS | Viscosity (cPs) in 4% KCl @ $100\ s^{-1}$ | | | | |
|---|---|---|---|---|---|
| by volume | 150° F. | 200° F. | 250° F. | 275° F. | 300° F. |
| 2% | 55 | 35 | 12 | <10 | <10 |
| 4% | 130 | 160 | 75 | 43 | <10 |
| 6% | 260 | 315 | 150 | 75 | <10 |

Example 4

Effect of Gellant Concentration on Viscosity

| Concentration of Armovis EHS | Viscosity (cPs) in 8% KCl @ $100\ s^{-1}$ | | | | |
|---|---|---|---|---|---|
| by volume | 150° F. | 200° F. | 250° F. | 275° F. | 300° F. |
| 2% | 55 | 40 | <10 | <10 | <10 |
| 4% | 135 | 140 | 58 | 40 | <10 |
| 6% | 230 | 320 | 145 | 100 | 10 |

Example 5

Effect of Gellant Concentration on Viscosity

| Concentration of Armovis EHS | Viscosity (cPs) in 4% $NH_4Cl$ @ $100\ s^{-1}$ | | | | |
|---|---|---|---|---|---|
| by volume | 150° F. | 200° F. | 250° F. | 275° F. | 300° F. |
| 2% | 66 | 50 | 20 | <10 | <10 |
| 4% | 160 | 165 | 80 | 45 | <10 |
| 6% | 280 | 330 | 165 | 90 | <10 |

Example 6

Effect of Gellant Concentration on Viscosity

| Concentration of Armovis EHS | Viscosity (cPs) in 8% $NH_4Cl$ @ $100\ s^{-1}$ | | | | |
|---|---|---|---|---|---|
| by volume | 150° F. | 200° F. | 250° F. | 275° F. | 300° F. |
| 2% | 70 | 50 | 22 | 16 | <10 |
| 4% | 155 | 160 | 76 | 65 | 20 |
| 6% | 250 | 320 | 160 | 125 | 30 |

Drilling and completion fluids are usually made in $CaCl_2$, $CaBr_2$, $ZnBr_2$ etc. solutions. The concentration of salt depends on the well depth. The deeper the well, the heavier the fluids, since they should exert sufficient hydrostatic pressure against subsurface formation. Additionally, fluids should be viscous enough to prevent the loss circulation and to carry the drilling cuts to the surface. Examples 7-9 illustrate the use of the Armovis EHS of the present invention for use in drilling and completion fluids.

Example 7

Effect of Gelant Concentration on Viscosity

| Concentration of Armovis EHS | Viscosity (cPs) in 13 ppg $CaCl_2/CaBr_2$ @ $40\ s^{-1}$ | | | | | |
|---|---|---|---|---|---|---|
| by volume | 150° F. | 200° F. | 250° F. | 300° F. | 350° F. | 400° F. |
| 2% | <10 | <10 | 25 | 45 | 43 | 40 |
| 4% | 31 | 30 | 130 | 167 | 154 | 190 |
| 6% | 40 | 30 | 185 | 200 | 185 | 190 |

Example 8

Effect of Gelant Concentration on Viscosity

| Concentration of Armovis EHS | Viscosity (cPs) in 15.1 ppg $CaCl_2/CaBr_2$ @ $40\ s^{-1}$ | | | | | |
|---|---|---|---|---|---|---|
| by volume | 150° F. | 200° F. | 250° F. | 300° F. | 350° F. | 400° F. |
| 2% | 29 | <10 | <10 | <10 | 10 | 14 |
| 4% | 52 | 23 | 8 | 74 | 130 | 135 |
| 6% | 74 | 35 | 19 | 210 | 230 | 240 |

The solution of $ZnBr_2$ is such heavy brine (17.2 ppg) and normally used in the deep well. However, no good rheological performance was observed at high temperatures before when a surfactant is mixed with $ZnBr_2$ solution. EHS is the only VES system that shows the good viscosity in $ZnBr_2$ brine system.

Example 7 shows Armovis EHS of the present invention in 20 wt % $ZnBr_2$ gives highly viscous gel up to 250° F.

Example 9

| Concentration of Armovis EHS by volume | Viscosity (cPs) in 20% $ZnBr_2$ @ 40 s$^{-1}$ | | | |
|---|---|---|---|---|
| | 150° F. | 200° F. | 250° F. | 275° F. |
| 6% | 150 | 200 | 130 | 65 |

Most of reservoirs are heterogeneous and permeability varies from one layer to another. During acidizing treatment, the acid will flow into the zones with high permeability, because they are less resistant. Only a limited amount of the acid flows into the low permeable zones or damaged zones. This uneven distribution of the injected acid could cause a major economic loss. The method that can effectively solve this problem is to use acid diversion technique. Surfactant-based acids recently have been effectively used as one of the diverting systems. After the acid reacts with the carbonate rock, pH increases and concentrations of divalent cations [Ca (II) and Mg (II)] increase in the spent acid. Both factors cause the surfactant molecules to form long rod-like micelles that will increase the apparent viscosity of the solution significantly and force the acid to flow into the low permeable zone.

Example 10

Illustrates the Use of the Armovis EHS of the Present Invention to Simulate the End Point of HCl Acidizing Applications for Carbonate Reservoirs

| Effect of Gelant Concentration on Viscosity | | | | | |
|---|---|---|---|---|---|
| Concentration of Armovis EHS by volume | Viscosity (cPs) in 30% $CaCl_2$ @ 40 s$^{-1}$ | | | | |
| | 150° F. | 200° F. | 250° F. | 300° F. | 350° F. |
| 4% | 75 | 170 | 350 | 180 | 150 |
| 6% | 200 | 290 | 550 | 370 | 300 |

The starting material Armeen APA-E® is used to prepare Armovis EHS of the present invention. The unreacted amine appears to cause the adverse effect on the rheological performance of the surfactant system.

Example 11

Shows the Effect of Amine Impurity Armeen APA-E® on the Rheological Performance of Gelant System for Use in Acidizing Fluids The gel contained 30% $CaCl_2$, 6% Armovis EHS and x % Armeen APA-E®. The percentage of APA-E is the percentage ratio between the concentration of Armeen APA-E® and the active concentration of Armovis EHS.

| Effect of Amine Impurity on Viscosity | | | | | |
|---|---|---|---|---|---|
| Armeen APA-E ®, X % | Viscosity (cPs) in 30% $CaCl_2$ @ 40 s$^{-1}$ | | | | |
| | 150° F. | 200° F. | 250° F. | 300° F. | 350° F. |
| 0% | 260 | 340 | 570 | 490 | 260 |
| 2.38% | 290 | 400 | 660 | 460 | 240 |
| 7.14% | 310 | 490 | 720 | 440 | 210 |
| 11.9% | 370 | 730 | 375 | 460 | 150 |
| 16.67% | 460 | 240 | 210 | 190 | 35 |
| 23.81% | 450 | 55 | <10 | <10 | <10 |

We claim:

1. An aqueous viscoelastic fluid which comprises at least one gelling agent composition, wherein said gelling agent composition comprises at least one viscoelastic surfactant of the general formula:

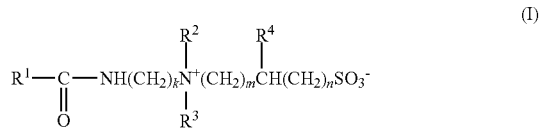

(I)

wherein $R_1$ is a saturated or unsaturated, hydrocarbon group of from about 17 to about 29 carbon atoms, $R_2$ and $R_3$ are each independently selected from a straight chain or branched, alkyl or hydroxyalkyl group of from 1 to about 6 carbon atoms, $R_4$ is selected from H, hydroxyl, alkyl or hydroxyalkyl groups of from 1 to about 4 carbon atoms; k is an integer of from 2-20, m is an integer of from 1-20 and n is an integer of from 0-20, and a solvent system that comprises water, monohydric alcohol and a dihydric or polyhydric alcohol, wherein the monohydric alcohol is ethanol and the dihydric or polyhydric alcohol is propylene glycol, wherein the weight to weight ratio of said monohydric alcohol to said dihydric or polyhydric alcohol in said gelling agent composition is from about 1.0 to 2.2, and wherein the water content of said gelling agent composition is 15% by weight or greater, and the weight to weight ratio of ethanol to water is from about 1.0 to 1.175.

2. The fluid of claim 1 wherein $R_1$ is a saturated or unsaturated, hydrocarbon group of from about 18 to about 21 carbon atoms, $R_2$ and $R_3$ are each independently selected from a straight chain or branched, alkyl or hydroxyalkyl group of from 1 to about 3 carbon atoms, $R_4$ is selected from H, alkyl or hydroxyalkyl groups of from 1 to about 3 carbon atoms; k is an integer of from 2-6, m is an integer of from 1-6 and n is an integer of from 0-6.

3. A well stimulation composition which comprises from about 0.5% to about 10% of the thickened viscoelastic fluid of claim 1.

4. The well stimulation fluid of claim 3 wherein said fluid is a fracturing fluid, matrix acidizing fluid, a completion acidizing fluid, a fracture acidizing fluid, or a damage removal acidizing fluid.

5. An acidizing fluid which comprised at least one acid and an effective amount of the viscoelastic fluid of claim 1.

6. The acidizing fluid of claim 5 wherein said acid is selected from the group consisting of mineral acids, organic acids, and mixtures thereof.

7. The acidizing fluid of claim 6 wherein said acid is selected from the group consisting of hydrochloric, hydrofluoric, acetic, formic, sulfamic, chloroacetic, and mixtures thereof.

8. A method of acidizing an underground formation which comprises injecting the acidizing fluid of claim 5 into said formation.

9. The method of claim 8 wherein said formation is a hydrocarbon reservoir or a water reservoir.

10. The method of claim 9 wherein said acidizing fluid is injected into said reservoir at a rate at or above the reservoir fracture pressure.

11. An aqueous fracturing fluid which comprises an effective amount of the viscoelastic fluid of claim 1.

12. A method of fracturing a subterranean formation comprising the steps of pumping the aqueous fracturing fluid of claim 11 through a wellbore and into a subterranean formation at a pressure sufficient to fracture the formation.

13. An aqueous viscoelastic fluid which comprises at least one gelling agent composition, wherein said gelling agent composition comprises at least one viscoelastic surfactant of the general formula:

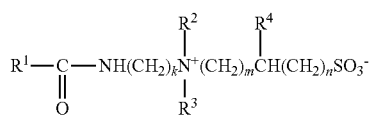
(I)

wherein $R_1$ is a saturated or unsaturated, hydrocarbon group of from about 17 to about 29 carbon atoms, $R_2$ and $R_3$ are each independently selected from a straight chain or branched, alkyl or hydroxyalkyl group of from 1 to about 6 carbon atoms, $R_4$ is selected from H, hydroxyl, alkyl or hydroxyalkyl groups of from 1 to about 4 carbon atoms; k is an integer of from 2-20, m is an integer of from 1-20 and n is an integer of from 0-20, and a solvent system that comprises water, from about 16 wt % to about 22 wt % ethanol, from about 10 wt % to about 16 wt % propylene glycol, and wherein the total weight % ethanol+propylene glycol is from about 25 weight % to about 40 weight %.

14. The fluid of claim 13 wherein the weight to weight ratio of ethanol to propylene glycol is from about 1.0 to 2.2.

15. The fluid of claim 14 which comprises from about 15-25 wt % water.

16. The fluid of claim 15 wherein the weight to weight ratio range of ethanol to water is from about 1.0 to about 1.175.

\* \* \* \* \*